United States Patent
Ostendarp et al.

(10) Patent No.: US 6,502,423 B1
(45) Date of Patent: Jan. 7, 2003

(54) METHOD AND APPARATUS FOR MAKING INDIVIDUAL GLASS PANES

(75) Inventors: Heinrich Ostendarp, Mainz (DE); Andreas Berndt, Mainz (DE); Rolf Suennemann, Gruenenplan (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/557,834

(22) Filed: Apr. 26, 2000

(30) Foreign Application Priority Data

Apr. 27, 1999 (DE) .......................................... 199 18 936

(51) Int. Cl.⁷ .............................................. C03B 18/02
(52) U.S. Cl. .............................. 65/29.14; 65/90; 65/91; 65/92; 65/93; 65/100; 65/101; 65/105; 65/112; 65/164; 65/166; 65/174; 65/176; 65/184; 65/183; 65/185; 65/193; 65/196; 65/197; 65/198; 65/199
(58) Field of Search ........................... 65/29.14, 90, 92, 65/93, 91, 100, 101, 105, 112, 164, 166, 174, 176, 184, 185, 183, 193, 196, 197, 198, 199

(56) References Cited

U.S. PATENT DOCUMENTS

| | | | | |
|---|---|---|---|---|
| 1,592,444 A | * | 7/1926 | Crowley | 65/197 |
| 1,593,567 A | * | 7/1926 | Byrnes | 65/90 |
| 2,505,103 A | | 4/1950 | Devol | |
| 3,191,857 A | * | 6/1965 | Galey et al. | 65/176 |
| 3,352,015 A | * | 11/1967 | Galabert et al. | 65/174 |
| 6,092,392 A | * | 7/2000 | Verlinden et al. | 65/193 |
| 6,098,862 A | * | 8/2000 | Chakrabarti et al. | 65/174 |

FOREIGN PATENT DOCUMENTS

| | | |
|---|---|---|
| DE | 2 118 589 | 10/1971 |
| DE | 33 29 843 A1 | 1/1984 |
| DE | 197 15 537 A1 | 10/1997 |
| DE | 196 49 488 A1 | 11/1997 |

OTHER PUBLICATIONS

Kitaigorodski, Technologie des Glases 1957, pp. 227–228.
Derwent Abstract of SU 546573 A.
Jebsen–Marwedel, Brueckner: "Glastechnische Fabrikationsfehler (Manufacturing Errors in Glass Engineering"; 3–D Ed. 1980, p. 7.
"Decoupe D'Un Verre Plat Etire . . . ", By J.–L. Lambert, et al, Silicates Industriels, BD. 38, NR. 7/8, 1973, pp. 145–147.

* cited by examiner

Primary Examiner—Michael Colaianni
(74) Attorney, Agent, or Firm—Michael J. Striker (57) ABSTRACT

A method and apparatus is described, with which individual rectangular glass panes of thickness between 0.03 mm and 2 mm can be cut from a glass band (2) drawn vertically from a hot forming device (1) in an in-line process with reduced rejects and reduced waste. The method provides that the glass band (2) drawn vertically downward through a vertical zone is cooled below a lower cooling point of the glass and subsequently is deflected through a bending zone (3b) with a bending radius between 0.1 m and 4 m into a horizontal zone (3c) in which it is horizontally oriented. The vertical alignment of the glass band (2) in the vertical zone (3a) is continuously monitored. At least one cutting process is performed on the horizontally oriented glass band (2) in the horizontal zone (3c). The device (20) for monitoring the vertical alignment of the glass band (2) includes at least three sensors (22a, 22b, 22c; 22a', 22b', 22c') that detect the glass edges These sensors can be mechanical rollers.

17 Claims, 6 Drawing Sheets

METHOD AND APPARATUS FOR MAKING INDIVIDUAL GLASS PANES

BACKGROUND OF THE INVENTION

1. Field of the Invention

The present invention relates to a method of making individual glass panes with a thickness between 0.03 mm and 2 mm, especially glass panes for electronic units, in which a glass band is drawn vertically downward from a hot forming tool and is subjected to a cutting operation, which includes an edge trimming process and/or cutting the panes to length from the glass band, and further processing steps, as needed. The invention also relates to an apparatus for making the individual glass panes and to an apparatus for monitoring the vertical alignment of the continuously produced vertical glass panes made from the glass band.

2. Prior Art

The individual glass panes for electronic units, such as laptops, which are also designated as display glass, are preferably each made with a thickness of from 0.4 to 2 mm. However glass panes with a thickness of down to 30 to 50 $\mu$m have been made in connection with the desire for special product properties for electronic units. On the one hand, it is a matter of a product that must have a high degree of planarity, on the other hand, a mass produced product which must be made as economically as possible. In order to arrive at reasonable manufacturing costs, the rejects, i.e. the panes with thickness variations, must be reduced and the waste minimized.

The glass panes are usually cut from a continuously produced glass band, which is drawn out vertically from a drawing orifice. For this purpose a drawing apparatus with several pairs of rollers is used, which engages on the border of the glass band. Although the drawing speed is identical on both sides, variations in the linearity of the glass band occur. Already variations of about 0.1 mm over a length of about 400 mm are too much for exactly cutting out individual rectangular glass panes, since the panes must be cut from the band without loss of intervening pieces and, not as in conventional processes, first approximately and then to length.

If an oblique course for the glass band is specified, the drawing roller pairs wander to the outside on one side and to the inside on another side relative to the glass. The trimming must thus have a safety margin or the position of the trimming or edging head must be adjusted to the position of the glass band.

Currently when the glass panes are cut from the vertical glass band, the cut is made transversely or across the width of the glass band. During the cutting away process the drawing force determined by the weight of the glass pane to be cut away changes continuously, which leads to feedback to the hot forming. In any case a tear or crack arising because of the cutting process easily continues into the hot forming region, which halts the entire hot forming apparatus. Disadvantageous thickness fluctuations in the resulting glass band are also caused by the feedback into the hot forming region, which increase the number of rejects. Similarly the variations caused by the cutting process continue until at the hot forming.

The drawing off of a glass band upward from the free surface of the melt and the guiding of the still plastic glass band horizontally over cooled bending rollers with a diameter of a few decimeters is described in Kitaigorodski, Technology of Glass (Technologie des Glases), 1957, pp. 227 to 228.

An apparatus for guiding horizontally is known from DE-OS 21 18 589 in which a gas cushion is provided between a guide roller and the glass band, so that the glass band does not rest on the roller. The glass band is drawn off upward or downward and is still plastic because of its high glass temperature, when it is guided. Edge rollers are used as parts of the guide rollers for guiding the glass band. Differences in the drawing forces acting in the longitudinal direction of the glass band in the bending region can be compensated for by maintaining the pressure differential in the gas cushion.

A photodetector device for observing the glass edge is known from the Derwent Abstract of SU 546 573A, in which the photosensor produces signals, which are used to control the drawing speed.

SUMMARY OF THE INVENTION

It is an object of the present invention to provide an apparatus and method, with which individual rectangular glass panels can be cut from a vertical glass band drawn from a hot forming device in an in-line method with reduced rejects and waste.

According to the invention, this object is attained, by a method, in which, after drawing off, the vertical glass band is cooled to a temperature below the lower cooling point (strain point) of the glass, subsequently is deflected in a bending zone, while it is freely suspended, with a bending radius between 0.1 m and 4 m and then is conveyed into a horizontal zone in which at least one cutting process is performed on the horizontal glass band. The viscosity of the glass, $\eta$, is $10^{14.5}$ dPas at the lower cooling point (strain point) of the glass.

The vertical alignment includes the linearity, the position and the angle of the glass edge. The linearity is a measure of the degree of bending of the edge of the glass band. The linearity is reduced or small, when the edge curvature is great or large. The position of the glass band relates to the lateral parallel displacement or shifting of the glass band, when the entire band is moved sideways. The oblique hanging of the glass band, i.e. the deviation from the vertical, is characterized by the angle. The vertical alignment of the glass band is preferably continuously monitored in order to minimize waste.

It has been shown that the cutting process for the glass band can be simplified and performed without feedback to the hot forming of the produced glass band, when the glass band is arranged in a horizontal position. Because of that feature the hot forming step is uncoupled from the subsequent production steps, so that a stabilization of the vertical glass band occurs and eventually occurring fluctuations or variations transmitted to the vertical band are in any event attenuated. The cutting to length of the glass panes has hardly any influence on the drawing forces acting on the vertical glass band. The process stability of the entire process chain is considerably improved because of those features. An additional advantage is that a crack or tear eventually occurring in the direction of the hot forming device during cutting continues only up to the guiding region and is halted there.

The cutting process for the horizontal glass band requires guiding of the vertical glass band, which up to now has not been considered to be possible with a glass band of a thickness from 0.4 mm to 2 mm. Since glass is a brittle material, it was believed that the flexural stiffness at lower temperatures at a glass thickness of about 0.4 mm is already so great that a deflection of about 90° could not be performed without breaking the glass. However it has been surprisingly found that, if a bending radius of between 1.5 m and 5 m is maintained, stable bending of the suspended glass band is possible. The bending radius is 3 to 4 m with a thickness of about 2 mm. Thus the bending radius can be, for example, 2 m for 1.1 mm thick glass and amounts to from 3 m to 4 m at a thickness of about 1.9 mm. So that no plastic deformation of the glass occurs, the temperature of the guided or deflected glass band must already be below the lower cooling point of the glass.

It has been shown that a deflection or bending of about 90° can be performed without glass breakage with thinner glasses of a thickness between 0.03 mm and 0.4 mm, even when the bending radius is selected so that it is between 0.1 m and 1.5 m.

In a preferred embodiment of the method for glasses having a thickness between 0.03 mm and 0.4 mm after the trimming the glass is rolled up or wound up instead of being cut to length. This simplifies the transport and it can be unrolled at a later time and cut. The glass can be more tightly wound, then prior to deflection or bending. The smallest winding radius amounts to about half the guiding radius.

In a preferred embodiment of the method for glasses between 0.03 and 2 mm the edge cutting and the cutting to length of the glass band is performed on the horizontal. The glass panes produced can subsequently be immediately after-worked.

The glass band is cooled prior to the deflection or guiding zone sufficiently so that it has a temperature, preferably between 30° C. and 80° C. in the deflection or guiding region. It is not necessary to perform the desired cooling with a special cooling apparatus, when the path between the hot forming device and the deflection zone is selected sufficiently large so that the glass band will cool by itself. Since the deflection radius is greater than 1.5 m, the deflection can be performed at a glass temperature on the order of room temperature.

No stable guidance or deflection of the glass band is possible with a nonlinear glass band when there are deviations of glass band from linearity. This problem is prevented when the linearity of the glass band, its position relative to the drawing rollers and/or the angle of the glass edges is continuously monitored. Since a plane of the vertical glass band is fixed by the drawing device, lateral wandering in the drawing direction, i.e. displacement of the plane of the strip from the vertical, must be prevented. The monitoring includes measurement of the occurring deviations from linearity of the glass band and/or its position and/or the angle and control of the drawing device for correction of the deviations and adjustment of the linearity of the glass band and/or its position and/or angle. This monitoring occurs preferably at at least one edge.

Preferably during the monitoring of the vertical alignment both translational motion of the entire glass band in the band plane and/or bending of the glass edge are detected and for example compensated by adjusting the drawing speed and/or the drawing speed difference between the left and the right edges or the drawing force and its difference on both opposing sides of the glass band. This can, for example, be caused by a slip control.

Preferably the feed speed of the horizontal glass band is controlled according to the bending or deflection radius. Changes in the bending radius arise because of different feed speeds of the vertical and horizontal portions of the glass band, for example, due to fluctuations in the hot forming.

It has surprisingly been shown that rapid fluctuations in the feed speed do not lead to breakage of the glass band in the bending zone, but those fluctuations in the bending zone can be resiliently dissipated. When the speed differences are longer, with long changes of the binding radius, which means preferably those of more than 8 to 12 sec, so that the glass band is more strongly stressed or compressed, the feed speed of the horizontal glass band is changed accordingly and adjusted.

The cutting process is preferably performed by means of laser beams. This has the advantage that no mechanical forces are exerted on the glass band, which leads on the one hand to crack formation and on the other hand to feedback to the hot forming stage. A laser beam cutting process has the advantage that no contamination of the glass surface with cut splinters can occur. The method described in DE-PS 197 15 537 is a suitable process.

Since the glass band is not halted during the cutting to length, the cutting tool moves with the glass band according to the feed speed of the glass band.

Preferably after the edge cutting and prior to the cutting away the edges can be worked or further processed. The edge processing can be performed by different methods. One method is a laser process in which, for example, only the bevel of the edge is removed. It is advantageous when all the cutting process occur by means of a laser, since otherwise the remaining facing surfaces of the cut edges have microcracks under certain circumstances, which is particularly not acceptable for display glass.

In an alternative embodiment the edge working is performed using a special grinding head, which removes a large amount of material from the glass with reduced forces and with reduced roughness for the resulting surfaces. For this purpose ultrasonically-assisted grinding heads are suitable, for example. The grinding wheel mounted on the ultrasonically-assisted grinding head is vibrated at a frequency of a few kHz, for example 20 kHz, in an axial vibration mode, by coupling of a mechanical vibration into it, so that the outer grinding wheel diameter is increased about a few $\mu$m periodically with the frequency of the vibration. Simultaneously the grinding wheel rotates like a conventional grinding wheel and because of the superposition of the vibrational motion and rotary motion the machining performance is drastically improved for identical surfaces of the glass. The grinding forces on the glass are substantially reduced in comparison to the convention edge working, which substantially simplifies the integration into in-line units by simplified handling systems.

After the edge working process a corner working process takes place, which can also be performed with the aid of an ultrasonically-assisted grinding head. The edge working can also be performed after the cutting-to-length process, since the edges, at which the glass pane is cut to length, must be subjected to an edge working after the cutting-to-length.

The glass band is preferably held without tension during the edge working and/or edge cutting processes. A suitable method is described, for example, in DE-OS 196 49 488. For handling the thin glass panes in transport systems, processing units and the like, two plates with a plane surface on at least one side thereof are provided, which are arranged parallel to each other with sufficient spacing for receiving the glass panes in a contact free manner. The plates are provided with a plurality of gas passage openings and the gas passage openings in the plates are connected with a glass reservoir by means of one or more ducts or the like in the plates in order to produce an over-pressure or an under-pressure. Respective portions of the gas passage openings are arranged pairwise opposite from each other. In this manner no direct pressure or drawing force is exerted on the glass panel or the glass band. When this process is combined with a laser cutting process, the entire method including cutting away of the glass panes and the edge working can be performed without contact with the glass band or glass panes. This type of handling can be also combined with conventional transport means, for example rolls or belts. The glass is primarily contacted in its lateral regions by the transport means.

A central cutting device for longitudinally cutting the glass band can be provided with very wide glass bands.

The apparatus for making individual glass panes according to the invention includes sensors for monitoring vertical alignment in the vicinity of the vertical drawing device, which are connected with the drawing device by means of a control device, a horizontal transport device arranged under the drawing device, and a cutting device for cutting away the glass panes from the glass band in the vicinity of the horizontal transport device. A bending or deflection zone is provided between the drawing device and the transport device, in which the glass band is freely suspended and guided into a horizontal orientation. A device for monitoring the bending radius or the amount of sag of the freely suspended glass band in the bending zone is also provided. The transport speed is controlled according to the measured bending radius of the guided glass band, so that the average amount of bending remains constant over time.

The cutting device has at least one laser. An edge processing device can be integrated into the cutting device. The order of cutting and cutting away and the edge processing can be arbitrarily selected.

The sensors for monitoring the bending or deflection from the vertical alignment can be mechanical or optical sensors. Mechanical sensors are preferred, as already described in connection with the apparatus for monitoring the linearity of the border or edge.

In one embodiment the device for monitoring the bending radius or the amount of the sag includes at least one ultrasonic distance-measuring sensor arranged in a radial direction and a controller. The controller is connected with the transport device, so that an adjustment of the feed speed occurs according to the bending radius.

The device for monitoring the vertical alignment of the edges of the continuously produced vertical glass band is characterized by at least three sensors monitoring the glass edge, which are arranged in a common holder, which is mounted on a locally fixed supporting member.

Preferably the sensors for monitoring the glass edge are formed by rollers, which contacts the glass edge. At least one roller is moveable relative to the holder and the holder is arranged so as to be moveable in the locally fixed supporting member. At least one motion sensor is provided for both the at least one moveable roller and also the holder.

The roller axes are preferably aligned perpendicularly to the plane of the glass band.

The rollers are mechanical sensors, with which the bending of the glass edge can be detected as well as the translational lateral motion of the glass band or the deviation angle from the vertical because of the motion of the rollers The at least one moveable roller is preferably arranged between both rollers. The position of the holder does not change itself during bending of the glass band, only the position of the moveable roller changes, so that the bending can be measured. The spacing of the rollers must be selected so that it is as large as possible, so that the rollers that are fixed to the holder at the upper and lower end of it can act as reference points. Typical roller spacing for these fixed rollers is from 60 cm to 100 cm.

The holder is preferably suspended on the locally fixed supporting member, so that the entire holder can move together with a translational motion of the glass band. Preferably a displacement sensor is arranged between the holder and the supporting element.

The holder is pressed with a force $F1$ against the edge or border of the glass pane. The force, with which the moveable roller is pressed against the glass band, amounts to $F2$. The relationship $F2 << F1$ is maintained between both forces $F1$, $F2$.

When a deviation from vertical orientation is detected by this device, the measurement result is transmitted to the controller, which is coupled with a drawing device. The drawing rollers are preferably driven on both sides by suitable drive devices, so that the respective drawing speeds of both sides of the glass band are individually controllable. Deviations from linearity can be compensated by suitable adjustments of the speed difference between the drawing rollers and the glass band can be returned again to its original orientation. The speed difference is very small in comparison to the absolute speed.

Since vertical orientation depends on no deviations and the monitoring device is arranged in a region within the drawing device, where relatively high glass temperatures are still present, it is important that the material of the holder is not influenced by temperature fluctuations. Thus the holder should be made from a material whose thermal expansion coefficient is approximately zero near room temperature up to about 200° C.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
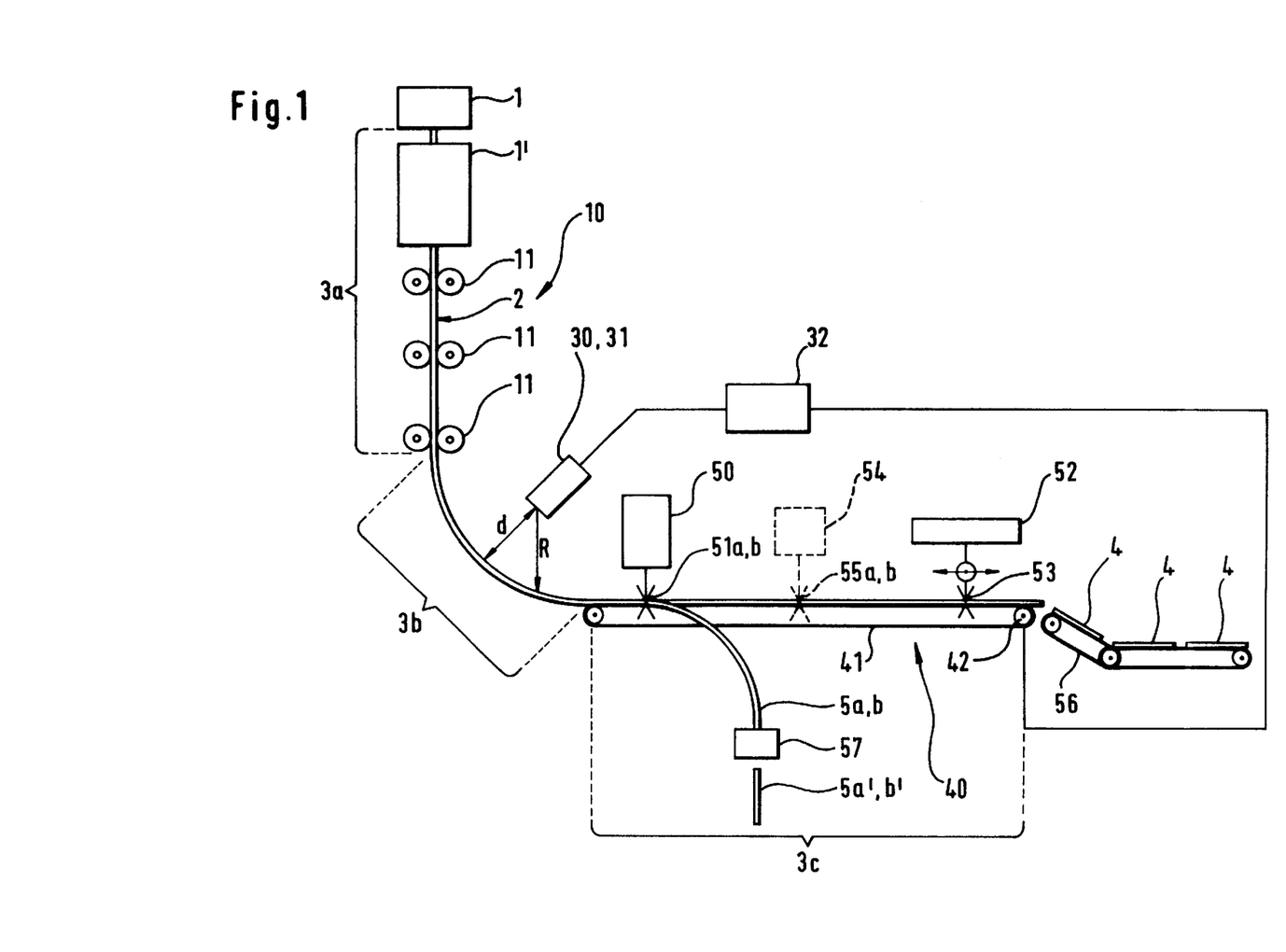
FIG. 1 is a schematic side view of one embodiment of an apparatus for making the glass panes according to the invention.
Figure 3:
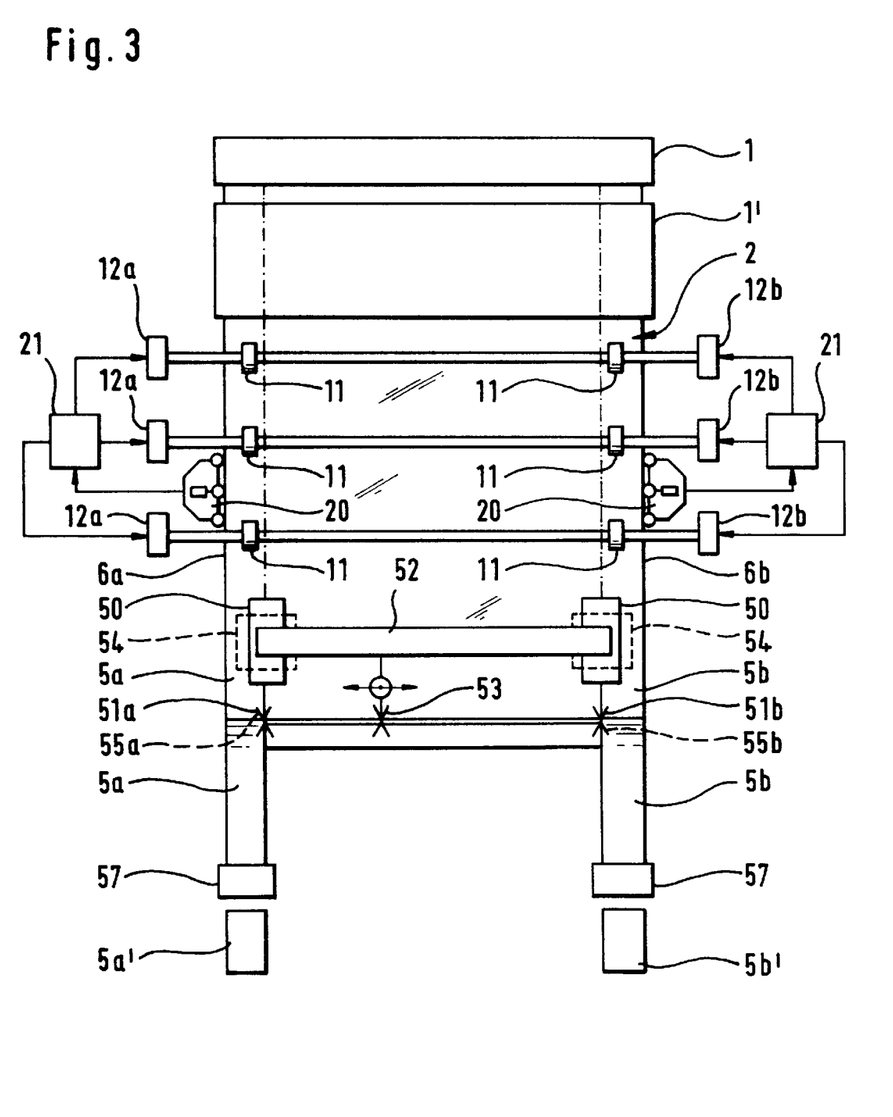
FIG. 3 is a front plan view of the apparatus shown in FIG. 1.

In FIG. 1 the entire apparatus is shown from the side. The glass melt is located in a vessel with a forming device 1, from which a glass band 2 is drawn vertically downward and subsequently passes through a cooling region 1'. The drawing device 10 includes several drawing roller pairs 11, which, as shown in FIG. 3, engage on the respective edges of the glass band 2. As it travels downward the glass band 2 is cooled until it is below its lower cooling point so that a bending or deflection into a horizontal orientation can subsequently occur.

In the embodiment described here using 0.55 mm thick glass the glass has a temperature of 70° C. at the beginning of the deflection process and a temperature of 40° C. at the end of the deflection process. With another glass thickness the temperatures vary slightly. During the deflection or bending process the temperature decreases approximately linearly. The deflection can also be performed, when the glass band is at room temperature.

In the vicinity of the drawing device 10 the glass band 2 passes through a vertical region 3*a*. The adjacent bending zone 3*b* is selected large enough so that a deflection radius R of about 1.50 m or more is adjusted. The deflection occurs while the glass band is freely suspended, i.e. without deflection rollers.

Subsequently the glass band 2 gradually goes through a horizontal zone 3*c* in which the glass band 2 is horizontally oriented. In the horizontal zone 3*c* the glass band 2 rests on a transport device 40 with conveyor belt 41 and drive device 42. An edge cutting device 50 with lasers and cooling devices, if necessary, as well as a cutting device 52 are arranged above the transport device 40. The cutting device 52, which can include a cooling device also, travels according to the feed speed of the glass band through the horizontal zone 3*c*.

When the edge cutting and the cutting of the glass panes to length occurs next, an edge working device 54 is provided between both the edge cutting device 50 and the cutting device 52 that cuts the glass panes to length. The working devices 50, 52, 54 operate using preferably laser beams 51*a*, 51*b*, 53, 55*a* and 55*b* which are indicated only schematically in FIGS. 1 and 2. The glass borders 5*a*, 5*b* are cut off with the edge cutting device 50 and are broken into the edge pieces 5*a*'and 5*b*'with the edge breaking device 57. As shown in FIG. 3, the edge is adjusted so that it is so wide that conditional deformation by the drawing rollers 11 is detected and can be rejected.

A monitoring device 30 for control of the changes of the bending radius R is arranged in the vicinity of the bending zone 3*b*. This monitoring device 30 comprises an ultrasonic spacing sensor 31, which is pointed radially at the surface of the glass band. The spacing sensor 31 is connected to a control device 32, which is connected, in turn, with the drive device 42 of the transport device 40. When a change of the bending radius R occurs, the control device 32 next tests whether or not the change is transient. If it is a transient fluctuation, the change of the bending radius is allowed to occur, so that the conveying speed of the glass band in the horizontal zone 3*c* remains unchanged. If a longer duration fluctuation occurs however, a correction of the feed speed must take place. A suitable limiting value can be input into the control device 32, so that the feed speed through the horizontal zone 3*c* is changed when the fluctuations have a duration greater than 10 sec. In that case a suitable signal is input to the drive device, so that an adjustment of the change of the bending radius can take place, so that the sagging in the deflection zone can again be adjusted to its original value. The form of the control device is preferably a P1 controller.

Figure 2:
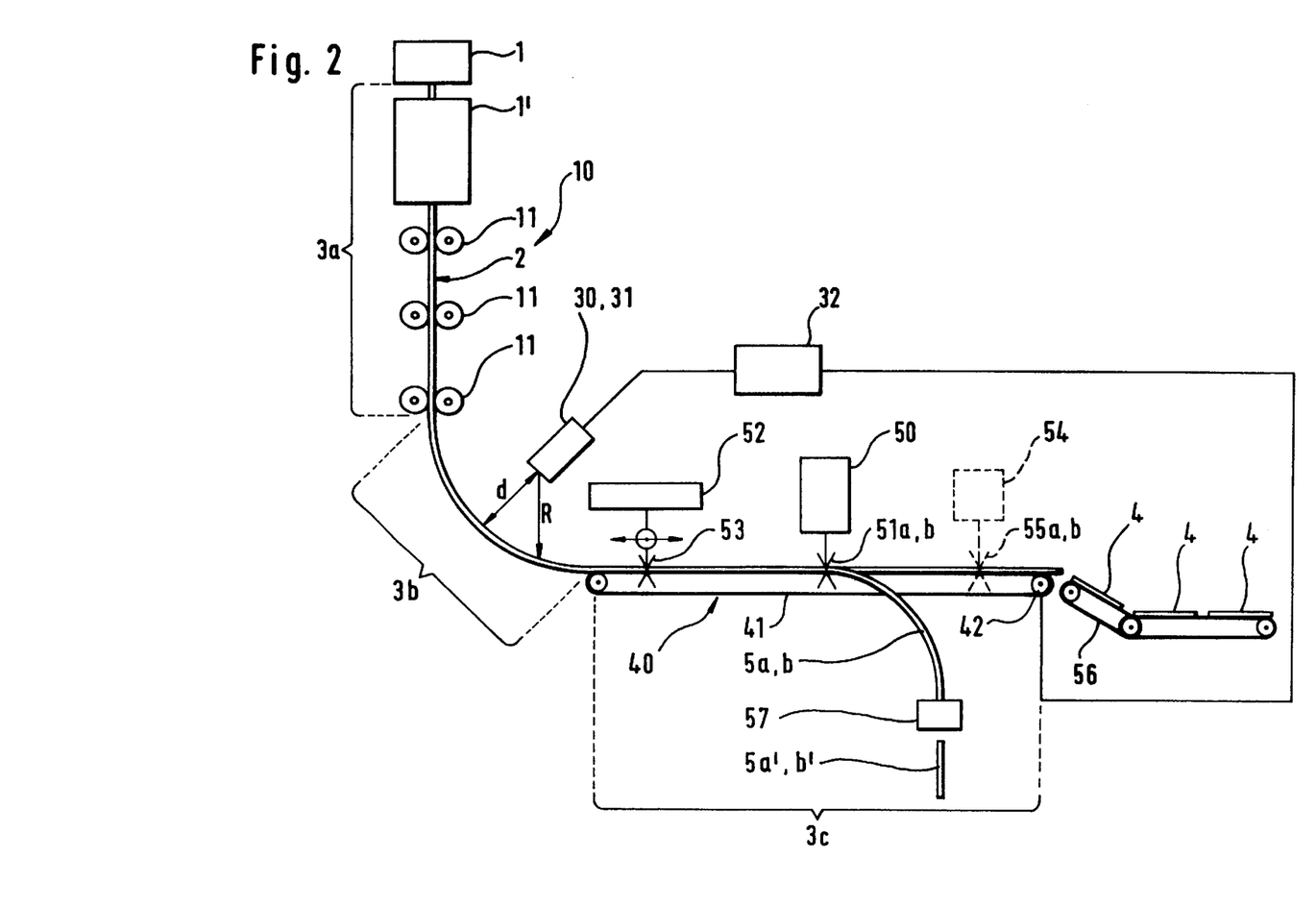
FIG. 2 is a schematic side view of another embodiment of an apparatus for making the glass panes according to the invention.

In FIG. 2 the order of the devices 50, 52, 54 is exchanged. In both figures the device 52 that cuts the glass panes to length is a scoring device. The individual glass panes 4 are formed (see also FIG. 1) by a glass pane breaking off device 56 formed by a break and bend in the transport device 40. Since the scratch or score in the glass band occurs in FIG. 2 by means of the scoring device upstream of the edge cutting device 50, the respective edges 5*a*, 5*b* break by themselves during the edge cutting into the individual edge pieces 5*a'*, 5*b'*.

In FIG. 3 respective monitoring devices 20 for monitoring the vertical alignment of the glass band are arranged on the opposite lateral edges 6*a*, 6 of the glass band. The structure and operation of these devices 20 is clearly illustrated in FIGS. 4 to 8. The respective monitoring devices 20 are connected with corresponding controllers 21, which are connected with drive devices 12*a* or 12*b* of the drawing roller pairs 11. The drawing roller pairs 11 can thus be controlled individually during a deviation from linearity and the linearity can then be restored to its set value by a change of the difference between the drawing speeds of the rollers in the roller pairs.

Figure 4:
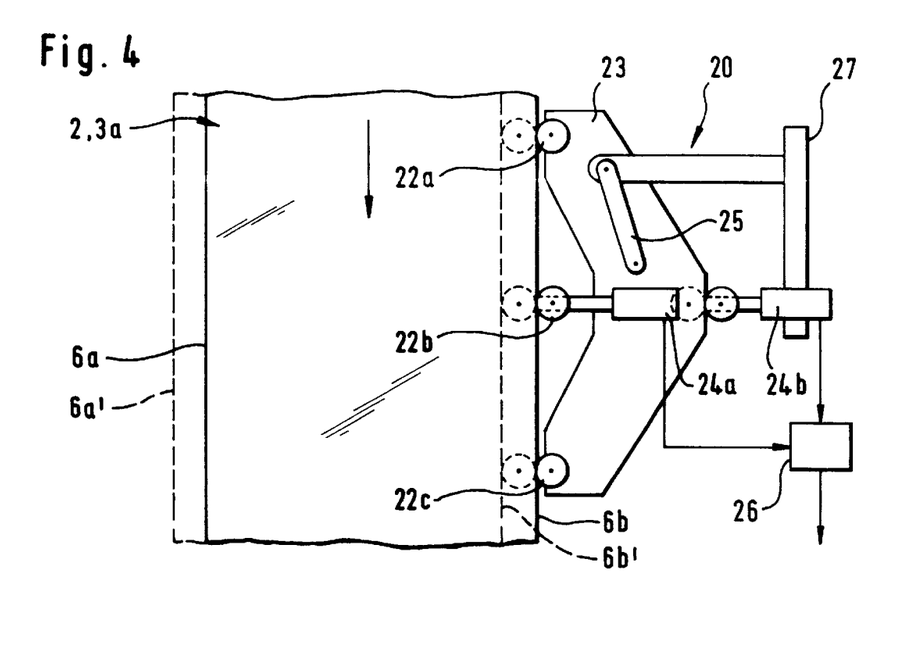
FIGS. 4 and 5 are schematic action views of a cutaway portion of the glass band together with a device for monitoring vertical alignment of the glass band showing two typical adjustments required during operation.

In FIG. 4 a translational lateral motion of the glass band 2 in the vertical zone 3*a* is shown. The original vertical alignment is shown by the dashed lines indicating the edges 6*a'*, 6*b'*. The glass band is also shown moved to the right, so that now the edges 6*a*, 6*b* take the position shown by the solid lines. A monitoring device 20 is arranged on the right edge, which has a holder 23, on which the three rollers 22*a*, 22*b*, 22*c* are arranged. The spacing of the rollers is selected as large as possible in order to be able to detect slight changes in the position of the edges. While both rollers 22*a*, 22*c* are arranged locally fixed relative to the holder 23, the center roller 22*b* is moveable and coupled with a first motion sensor 24*a*. The roller 22*b* is pressed by means of a spring of force F2 against the edge 6*b* of the glass band 2. The holder 23 is connected with a locally fixed supporting member 27 by means of a pivoting connected rod 25. In the embodiment shown in the drawing the entire roller holder 23 and thus the three rollers 22*a*, 22*b*, 22*c* can move from their dashed position into the illustrated position. This deviation is detected by means of the motion sensor 24*b*. Both sensors 24*a*, 24*b* are connected to a processor 26.

Figure 5:
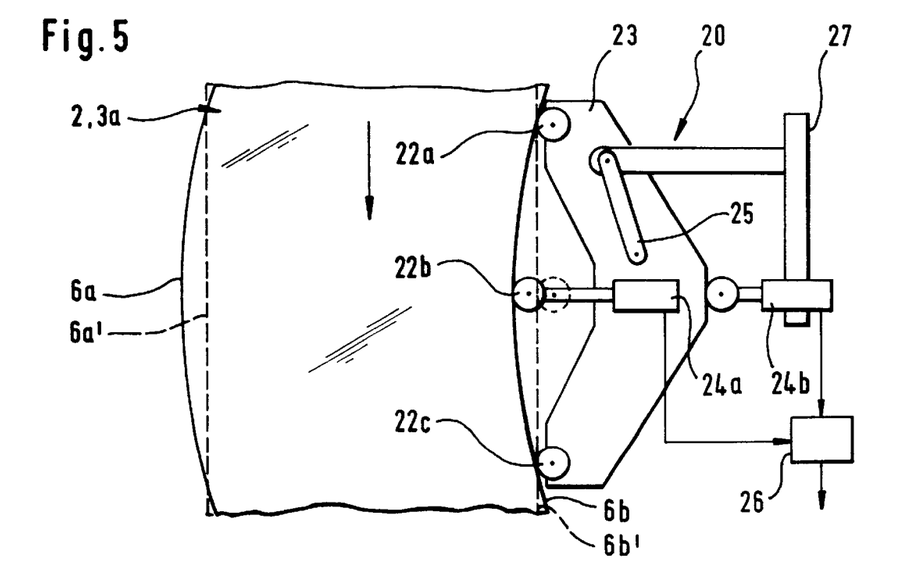

In FIG. 5 another troublesome deviation is illustrated. This deviation is a bending of the glass edges 6*a*, 6*b* laterally. Although the rollers 22*a*, 22*c* have hardly changed their positions, the center roller 22*b* clearly has moved to the left, which is detected by the motion sensor 24*a*. An adjustment of the drive speeds of the drive rollers 11 can be triggered by means of appropriate signals of the sensors 24*a* and/or 24*b* sent to the controllers 21, which are discussed in connection with FIG. 3.

Figure 6:
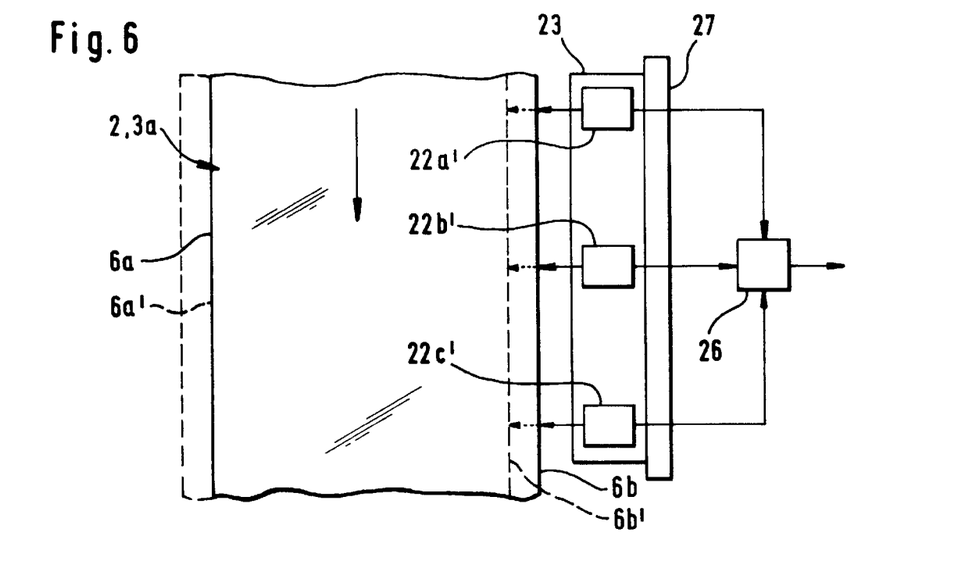
FIGS. 6 to 8 are schematic action views of a cutaway portion of the glass band together with another embodiment of a device for monitoring vertical alignment of the glass band showing three typical adjustments required during operation.
Figure 7:
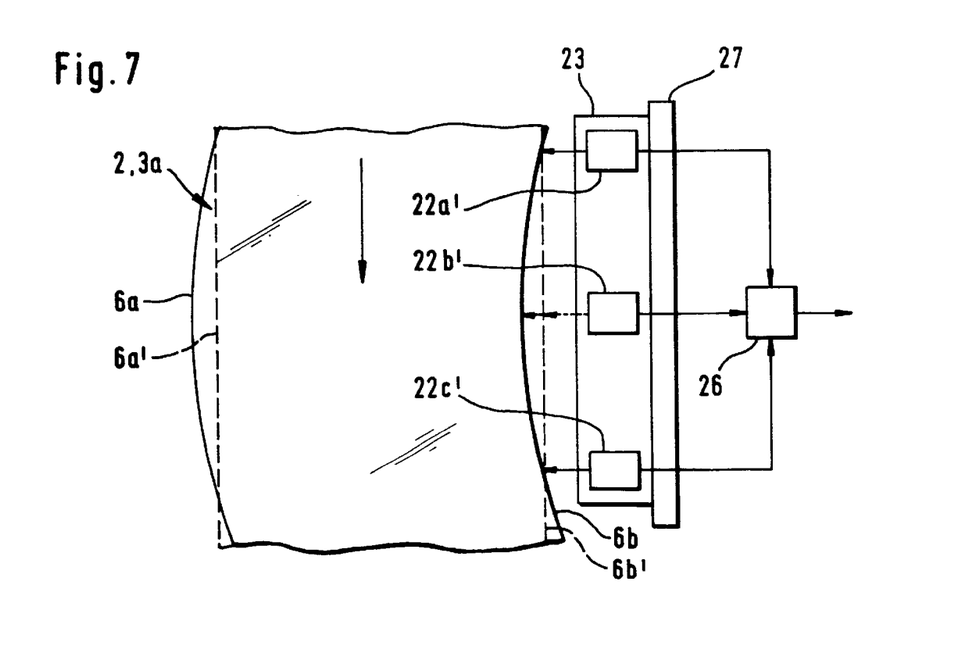
Figure 8:
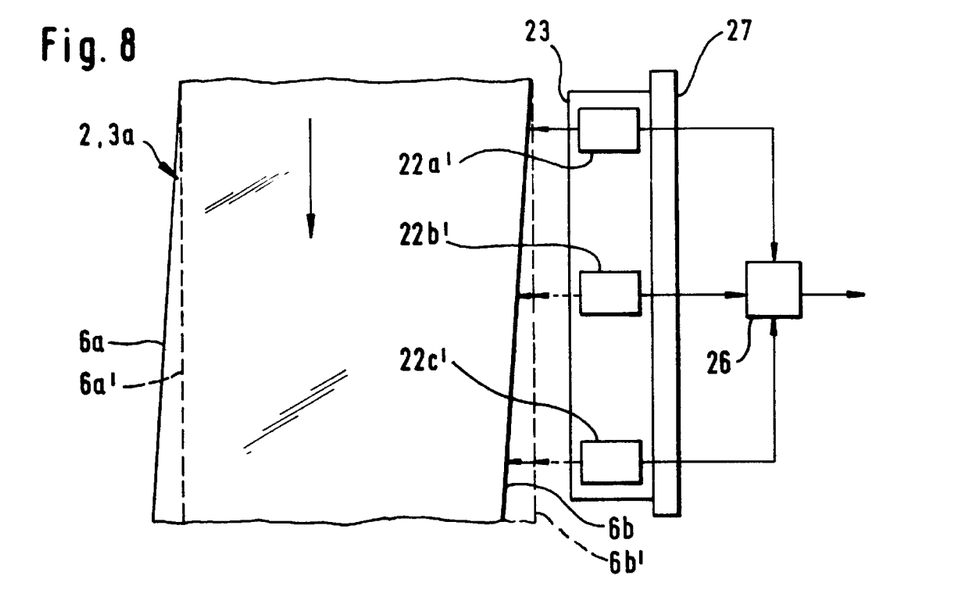

In FIGS. 6 to 8 an additional embodiment of the monitoring device 20 is shown. Instead of rollers optical or ultrasonic sensors 22*a'*, 22*b'*and 22*c'* are mounted on a common locally fixed supporting member 27. Motion is detected by the three sensors 22*a'*, 22*b'* and 22*c'* during a lateral displacement of the glass band, which is the same for all three sensors in this case.

The bending shown in FIG. 7 and the angular deviation shown in FIG. 8 can be detected by these three sensors.

Figure 9:
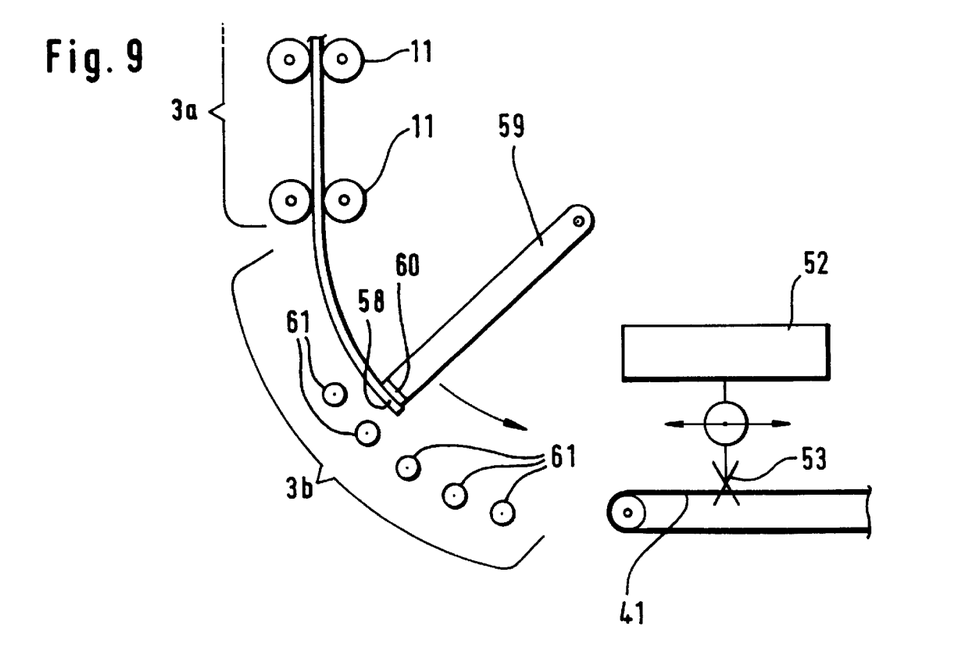
FIG. 9 is a cutaway side view of the bending zone of the apparatus of FIG. 1.

In FIG. 9 the bending zone 3*b* is shown in detail for illustrating the guidance of the glass band. The glass band 2 is coarsely cut (which is not illustrated) in the vertical zone 3*a* at its front end 58 and is engaged by a pivoting element 59, which has a vacuum outlet 60 at its front end, with which the glass band is caught. The pivoting element 59 is swung in the direction of the arrow so that the glass band can be fed to the conveyor belt 41. The tangential speed of the pivoting element 59 is adjusted to the conveyor belt speed. After the transfer to the conveyor belt 41 the glass band is released.

A number of rolls 61 are arranged spaced from each other along a roll track, which is substantially circular arc shaped, under the glass band 2 in the bending zone 3*b*. This roll track is located a few centimeters under the glass band and guides the glass band in the event that a break in the glass band occurs. The roll track receives the glass band and guides it to the horizontal conveying system. Subsequently the bending radius is reduced so that the glass band is lifted again from the roll track. During the normal operation the glass band does not rest on these rolls 61 in the bending zone 3*b*.

The disclosure in German Patent Application 199 18 936.6-45 of Apr. 27, 1999 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for manufacturing individual glass panes, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A method of making individual glass panes each having a thickness between 0.03 mm and 2 mm, said method comprising the steps of:
   a) drawing a glass band vertically downward from a hot forming device through a vertical zone at a temperature below a lower cooling point of the glass band;
   b) subsequently deflecting the glass band in a bending zone, in which the glass band is freely suspended and has a bending radius of between 0.1 m and 4 m, so that the glass band passes from the bending zone into a horizontal zone in which the glass band has a substantially horizontal orientation; and
   c) cutting edge portions from the glass band in an edge cutting process; and
   d) cutting the glass band to length to form the individual glass panes in another cutting process;
      wherein at least one of the cutting processes occurs in the horizontal zone in which the glass band is in the substantially horizontal orientation.

2. The method as defined in claim 1, further comprising continuously monitoring a vertical alignment of the glass band in the vertical zone.

3. The method as defined in claim 1 or 2, wherein said bending radius is from 1.5 m to 4 m with glass panes having a thickness of from 0.4 mm to 2 mm.

4. The method as defined in claim 1 or 2, wherein said bending radius is from 0.1 m to 1.5 m with glass panes having a thickness of from 0.03 mm to 0.4 mm.

5. The method as defined in claim 1, wherein said bending radius is from 0.1 m to 1.5 m with glass panes having a thickness of from 0.03 mm to 0.4 mm, and further comprising winding up the glass band after the cutting of the edge portions from the glass band.

6. The method as defined in claim 1, wherein both the cutting of the edge portions and the cutting of the glass band to length occur in the horizontal zone in which the glass band is in the horizontal orientation.

7. The method as defined in claim 1, wherein the glass band is cooled sufficiently so that the glass band is at a temperature of between 30° C. and 80° C. in the horizontal zone.

8. The method as defined in claim 1, further comprising controlling a feed speed of the glass band in the horizontal zone according to the bending radius.

9. The method as defined in claim 8, further comprising changing said feed speed in the horizontal zone when a bending radius change occurs for more than 8 to 12 seconds in order to adjust the bending radius to its original value prior to the bending radius change.

10. The method as defined in claim 1, further comprising monitoring at least one edge of the glass band in the vertical zone in order to determine a vertical alignment of the glass band.

11. The method as defined in claim 10, wherein the monitoring of the at least one edge of the glass band includes detecting both a lateral translational motion of the glass band in a plane including said at least one edge and a bending of the edge and controlling a drawing speed of the glass band or a drawing speed difference for the edge portions of the glass band according to the detecting.

12. The method as defined in claim 1, wherein the cutting processes include cutting by means of laser beam.

13. The method as defined in claim 1, wherein cutting the glass band to length to form the individual glass panes takes place using a cutting tool and the cutting tool is moved according to a feed speed of the glass band.

14. The method as defined in claim 1, further comprising working the edge portions after the cutting processes.

15. The method as defined in claim 14, wherein the glass band is held without tension during the working of the edge portions and during the cutting of the edge portions from the glass band.

16. The method as defined in claim 1, wherein said glass panes are designed for electronic devices.

17. A method of making individual glass panes each having a thickness between 0.03 mm and 2 mm, said method comprising the steps of:
   a) drawing a glass band vertically downward from a hot forming device with drive roller pairs through a vertical cooling zone until the glass band reaches a temperature below a strain point of the glass band;
   b) engaging respective rollers of said driver roller pairs on opposite edge regions of said glass band while said glass band is oriented vertically and providing means for driving said respective rollers separately at individually controlled drive speeds;
   b) subsequently deflecting the glass band in a bending zone, in which the glass band is freely suspended and has a bending radius of between 0.1 m and 4 m, so that the glass band passes from the bending zone into a horizontal zone in which the glass band has a substantially horizontal orientation;
   c) cutting edge portions from the glass band in an edge cutting process;
   d) cutting the glass band to length to form the individual glass panes in another cutting process;
   e) measuring said bending radius and controlling a feed speed of the glass band in the horizontal zone according to said bending radius determined during the measuring in order to control the bending radius in the bending zone;
   f) monitoring at least one edge of said glass band to detect linearity deviations and correcting said linearity deviations by controlling said drive speeds of said rollers of said roller pairs individually;
   g) monitoring said at least one edge of said glass band to detect lateral position deviations of said glass band and correcting said lateral position deviations of said glass band by controlling said rollers; and
   h) monitoring said at least one edge of said glass band to detect curvature of said at least one edge and correcting said curvature of said at least one edge by controlling said rollers;
      whereby rejects and waste are reduced.

* * * * *